United States Patent [19]
Luckevich et al.

[11] Patent Number: 5,642,920
[45] Date of Patent: Jul. 1, 1997

[54] METHOD AND SYSTEM FOR ANTILOCK BRAKING ON A DEFORMABLE SURFACE

[75] Inventors: Mark Luckevich, Ann Arbor; Bernard W. Johnson, Brighton, both of Mich.; Dan Negrin, Wiesbaden, Germany

[73] Assignee: Kelsey-Hayes Co., Livonia, Mich.

[21] Appl. No.: 679,533

[22] Filed: Jul. 12, 1996

Related U.S. Application Data

[62] Division of Ser. No. 382,841, Feb. 3, 1995, Pat. No. 5,547,267.

[51] Int. Cl.⁶ ........................................... B60T 8/68
[52] U.S. Cl. ..................... 303/156; 303/157; 303/174; 303/165
[58] Field of Search ............................ 303/157, 174, 303/165, 163, 164, 68, 156, 159, 160, 199; 364/426.01, 426.02, 426.03

[56] References Cited

U.S. PATENT DOCUMENTS

| | | |
|---|---|---|
| 3,724,916 | 4/1973 | Hirzel . |
| 3,729,234 | 4/1973 | Hirzel . |
| 3,791,701 | 2/1974 | Riordan . |
| 3,838,890 | 10/1974 | Wind . |
| 3,953,080 | 4/1976 | Bremer . |
| 3,964,796 | 6/1976 | Bremer . |
| 4,037,882 | 7/1977 | Taylor . |
| 4,338,669 | 7/1982 | Skarvada . |
| 4,562,542 | 12/1985 | Skarvada . |
| 4,912,744 | 3/1990 | Hurst . |
| 4,938,544 | 7/1990 | Braschel et al. ............ 303/165 |
| 5,249,850 | 10/1993 | Kampfmann et al. ........ 303/165 |
| 5,358,318 | 10/1994 | Ikeda et al. . |
| 5,547,267 | 8/1996 | Luckevich et al. .......... 303/165 |

*Primary Examiner*—Douglas C. Butler
*Attorney, Agent, or Firm*—Brooks & Kushman P.C.

[57] ABSTRACT

A brake pressure controller, responsive to a wheel speed sensor and coupled to a brake, performs a cyclic control of pressure applied to the brake. A brake pressure cycle includes a pressure apply stage and a pressure dump stage having activation conditions based upon a slip threshold parameter. A predetermined base threshold quantity is modified in dependence upon a measured time duration of the pressure dump stage and/or a slip depth error quantity so that a greater amount of slip is added to the base slip threshold when braking on a deformable surface than when braking on a non-deformable surface.

12 Claims, 4 Drawing Sheets

METHOD AND SYSTEM FOR ANTILOCK BRAKING ON A DEFORMABLE SURFACE

This a divisional of application Ser. No. 08/382,841 filed on Feb. 3, 1995, now U.S. Pat. No. 5,547,267.

TECHNICAL FIELD

The present invention relates to antilock brake pressure control for a vehicle braking on a deformable surface.

BACKGROUND ART

As is well known in the art, wheel lock-up and vehicle skidding can be caused by severe slippage between the wheel and the driving surface. In many cases, lock-up increases required stopping distance and reduces directional control of the vehicle.

Such problems have been generally addressed with the advent of antilock brake systems (ABS). A typical ABS is designed to identify an excessive wheel slip condition by comparing the measured velocity of a wheel to a reference speed, which is an estimate of the true vehicle speed based on current and previous values of individual wheel velocities. If the velocity of a particular wheel is significantly less than the reference speed, then that wheel is determined to be experiencing excessive slip. In response, hydraulic pressure actuating a corresponding brake is modulated to reduce brake torque, thereby reducing braking force between the wheel and driving surface which, in turn, reduces wheel slip.

In practice, ABS first isolates existing brake fluid in an individual wheel brake from increasing brake fluid pressure in the master cylinder in order to hold pressure in the brake constant. ABS then dumps fluid from the brake to reduce pressure therewithin. Thereafter, ABS typically holds pressure in the brake constant for a selected amount of time.

After a period of constant pressure following pressure reduction, pressure is then increased until excessive wheel slip occurs again. The resulting cycle of decreasing, maintaining, and then increasing pressure is repeated until excessive slip no longer occurs. The specifics of this brake pressure cycle depend on the particular algorithm employed within the ABS logic control unit, along with vehicle characteristics and the driving surface conditions encountered at the time of braking.

One parameter which represents driving surface conditions is the coefficient of friction, commonly denoted by mu ($\mu$). Two classes of surfaces can be defined qualitatively in terms of $\mu$. A high $\mu$ surface is one wherein relatively good braking ability is possible, such as dry asphalt. A low $\mu$ surface is one wherein relatively poor braking ability is possible, such as a snow or ice-covered road, or wet asphalt.

Certain types of driving surfaces, such as gravel, packed snow, and certain types of ice, are known in the art as "deformable" surfaces. On non-deformable surfaces, ABS forces wheel departures on a regular basis where wheel slip will exceed the optimum (peak) value for short periods of time. In contrast, on deformable surfaces, surface irregularities can cause apparent departures well before the peak slip is reached. Due to irregular wheel decelerations, pressure induced departures can also cause premature dumping and quick wheel speed recovery. In both cases, however, the departure depths are usually small.

Although ABS helps to decreased stopping distance on many surfaces, it is also known in the art that locked wheels actually improve stopping distance on deformable surfaces. Even so, locked wheels are not necessarily desirable on deformable surfaces because reduced directional control of the vehicle persists.

For this reason, it would be desirable for ABS to modify brake pressure control when the vehicle is braked on a deformable surface wherein locked wheels improve stopping distance.

SUMMARY OF THE INVENTION

It is therefore an object of the present invention to provide a method and system for reducing the stopping distance of a vehicle braked on a deformable surface while maintaining directional control.

In carrying out the above object, there is provided a method for use with a vehicle having an antilock brake system (ABS) including a pressure-responsive brake, the method for controlling the brake during an ABS event and comprising performing an ABS brake pressure cycle including a pressure apply stage and a pressure dump stage, the ABS brake pressure cycle having an activation condition based upon a slip threshold parameter. The method further comprises measuring a time duration of the pressure dump stage of the cycle and varying the slip threshold parameter in dependence upon the measured time duration of the pressure dump stage.

Alternatively, the method may comprise performing an ABS brake pressure cycle having an activation condition based upon a slip threshold parameter and determining a slip depth error quantity during the ABS cycle. The alternative method further comprises varying the slip threshold parameter in dependence upon the slip depth error quantity.

In further carrying out the above object, there is provided a system for controlling a pressure applied to a pressure-responsive brake of a wheel of a vehicle, the system comprising a wheel sensor for sensing a rotational behavior of the wheel, and a brake pressure controller, responsive to the wheel sensor and coupled to the brake, which performs a cyclic control of pressure applied to the brake, wherein a brake pressure cycle includes a pressure apply stage and a pressure dump stage having an activation condition based upon a slip threshold parameter. The system further comprises duration measuring means for measuring a time duration of the pressure dump stage of the brake pressure cycle, and threshold varying means for varying the slip threshold parameter employed by the brake pressure controller in dependence upon the measure time duration of the pressure dump stage.

Alternatively, the system may comprise a wheel sensor for sensing a rotational behavior of the wheel, and a brake pressure controller, responsive to the wheel sensor and coupled to the brake, which performs a cyclic control of pressure applied to the brake, a brake pressure cycle having an activation condition based upon a slip threshold parameter. The alternative system further comprises slip depth error determining means for determining a slip depth error quantity during the ABS cycle, and threshold varying means for varying the slip threshold parameter in dependence upon the slip depth error quantity.

This and other objects, features, and advantages of the present invention will be apparent to those of ordinary skill in the art from the following description of the best modes for carrying out the invention, taken in conjunction with the accompanying drawings.

BEST MODES FOR CARRYING OUT THE INVENTION

The present invention overcomes the disadvantages of previous antilock brake systems (ABS) by detecting the presence of a deformable surface based upon a measured time duration of a pressure dump stage and/or a measured maximum slip depth of an ABS cycle. More specifically, the present invention recognizes that a braking procedure on a deformable surface does not require an extensive pressure dump in order to obtain wheel recovery. Experimentally, it can be shown that the average duration of the pressure dump stage and/or the measured maximum slip depth of one or more ABS cycles is significantly less for a deformable low μ surface than for a non-deformable low μ surface.

Figure 1A:
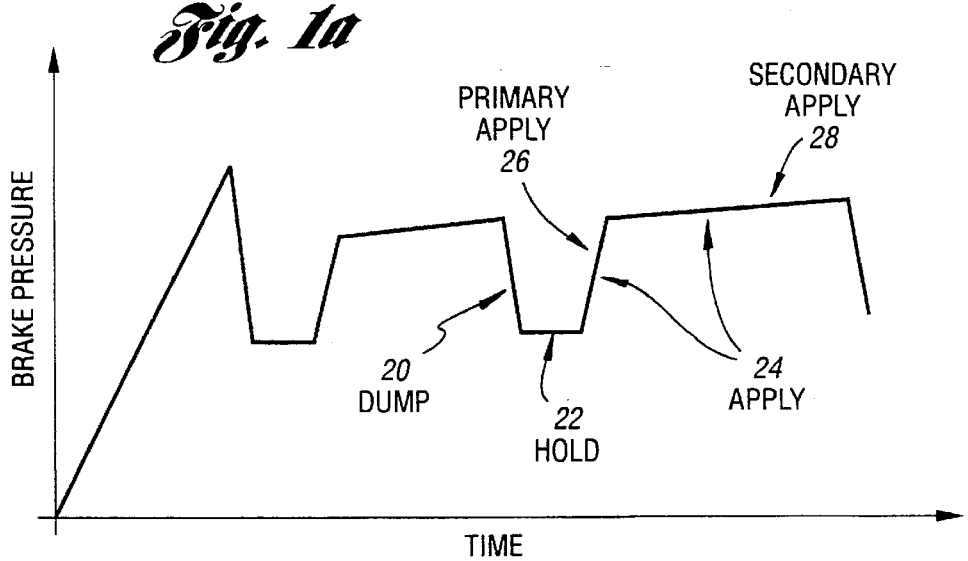
FIGS. 1a and 1b are illustrations of a brake pressure cycle and a corresponding wheel speed versus time plot, respectively.
Figure 1B:
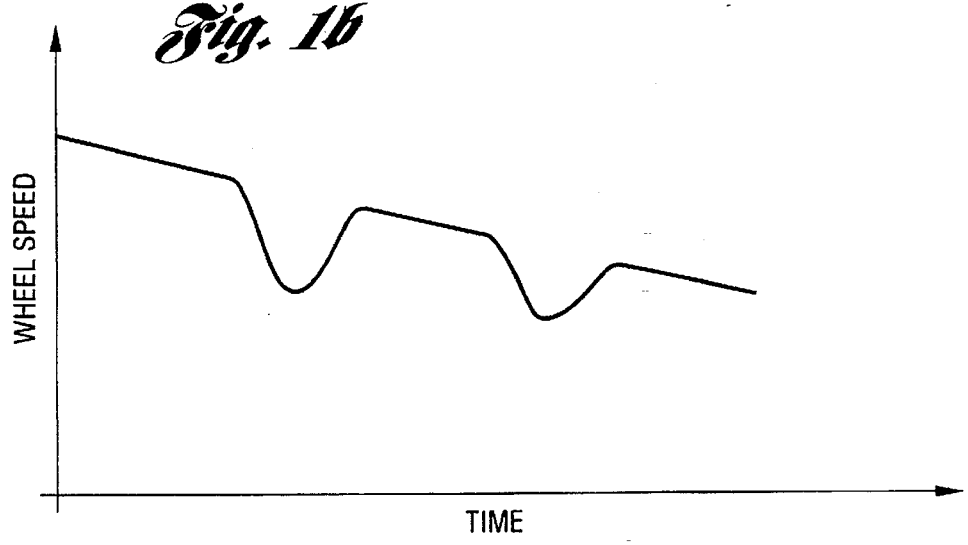

Referring to FIGS. 1a and 1b, there is shown an example of a brake pressure cycle that occurs during an ABS event, and a corresponding graph of wheel speed versus time during that cycle, respectively. The cycle comprises a dump stage 20 wherein brake pressure decreases with time, a hold stage 22 wherein pressure is nearly constant with time, and an apply stage 24 wherein pressure increases with time. Apply stage 24 itself comprises primary 26 and secondary 28 apply stages, wherein the primary apply stage 26 has a higher average rate of increase. As a result of such cyclic brake pressure control, the corresponding wheel speed shown in FIG. 1b is also cyclic, with an overall decreasing trend.

Figure 2:
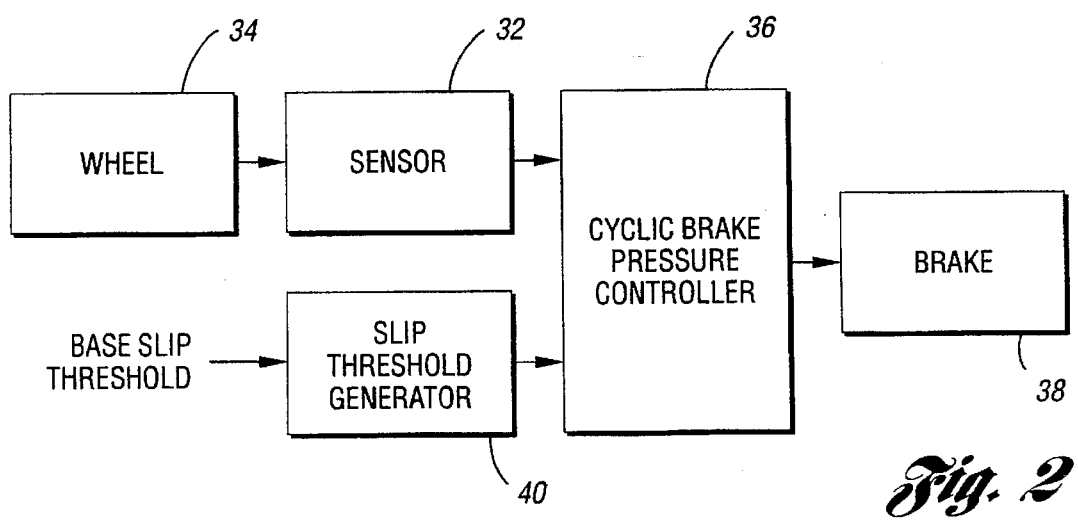
FIG. 2 is a block diagram of a system according to the present invention.

A block diagram of a system of the present invention is illustrated in FIG. 2. A wheel sensor 32 is coupled to a wheel 34 of a vehicle for sensing rotational behavior thereof. Wheel sensor 32 is operatively connected to a brake pressure controller 36, which performs cyclic control of pressure applied to a brake 38 in response to signals received from wheel sensor 32. The brake pressure stages shown in FIG. 1a can be provided by pulsed application and release of hydraulic fluid, although other strategies may also be employed.

The apply 24 and dump 20 stages are each initiated with respect to a corresponding set of activation conditions employed in brake pressure controller 36. Commonly used activation conditions for dump stage 20 are based on the amount of slip or the amount of deceleration in wheel 34. Regardless of the complete set of activation conditions, brake pressure modulation by controller 36 is based upon a slip threshold parameter. More specifically, the aforementioned activation condition is satisfied when the slip in wheel 34 exceeds a slip threshold parameter. Wheel slip can be computed as the difference between wheel speed measured by sensor 32 and a reference speed computed by controller 36.

A base slip threshold, computed based on vehicle speed, is supplied to a slip threshold generator 40. In turn, generator 40 modifies the base slip threshold to supply a value of the slip threshold parameter to controller 36. Generator 40 may modify the base slip threshold based on a variety of factors. In one embodiment, generator 40 may modify the base slip threshold by computing the value of the slip threshold parameter in dependence upon a time duration of dump stage 20 produced by controller 36. In another embodiment, generator 40 may modify the base slip threshold by computing the value of the slip threshold parameter in dependence upon a maximum slip depth measured at wheel 34. Generator 40 may also modify the base slip threshold according to a combination of these strategies.

Figure 3:
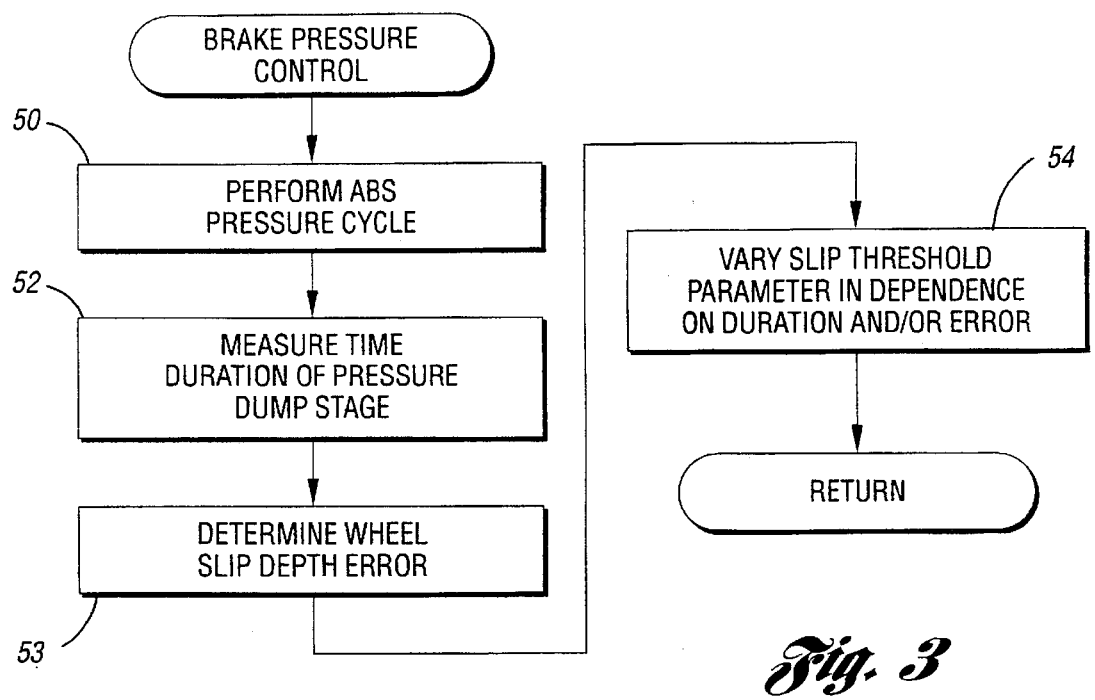
FIG. 3 is a flowchart of a method according to the present invention.

Referring now to FIG. 3, there is shown a flowchart for a method of controlling brake 38 during an ABS event according to the present invention. In block 50, an ABS cycle, which includes apply 24 and dump 20 stages having activation conditions based upon a slip threshold parameter, is performed. A duration of dump stage 20 is measured in block 52. Block 53 performs a step of determining a slip depth error quantity. In block 54, the slip threshold parameter is varied in dependence upon the duration of dump stage 20 and/or slip depth error.

Figure 4:
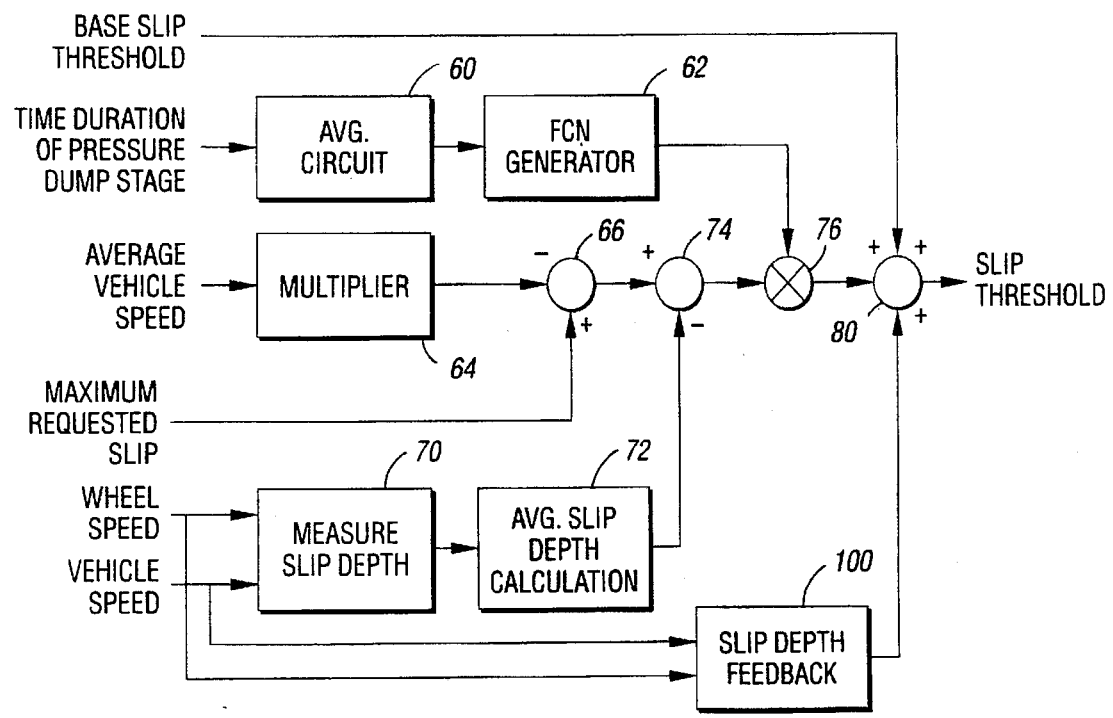
FIG. 4 is a block diagram of an embodiment of a slip threshold generator.

FIG. 4 illustrates a block diagram representation of an embodiment of slip threshold generator 40 shown in FIG. 2. The measured duration of dump stage 20 is applied to an averaging circuit 60 which provides a means for calculating an average dump time quantity based upon the dump time of one or more ABS cycles. As shown, average dump time is applied to a function generation circuit 62, which produces a gain quantity as a function of average dump time. As is discussed later, the gain quantity is employed to distinguish between non-deformable surfaces and deformable surfaces.

In one embodiment, a requested slip quantity is formed by applying an average vehicle deceleration signal to a fixed multiplier circuit 64, to produce a quantity which is subtracted from a maximum requested slip quantity by a differencing circuit 66. As is well known in the art, deformable surfaces are low μ. Since average vehicle deceleration provides an estimate of driving surface coefficient of friction, it can be used to control the influences of the requested slip quantity. Hence, the offset to the slip threshold will be smaller when braking on a high μ surface, and larger when braking on a low μ surface.

Based upon the rotational behavior of wheel 38 sensed by sensor 32 and a computed vehicle speed, block 70 measures a slip depth quantity during the ABS cycle. The measured slip depth is applied to an averaging circuit 72 in order to calculate an average slip depth based upon one or more ABS cycles.

Differencing circuit 74 compares the requested slip quantity to the average slip depth in order to generate an error signal. Specifically, the differencing circuit 74 computes the difference between the requested slip quantity and the average slip depth (SLIP DIF). If the difference is greater than zero, the difference is provided as the output. If the difference is less than zero, a representative zero signal is provided as the output. A product of the gain quantity and SLIP DIF is determined by a multiplier 76. The output of multiplier 76 is a threshold modification quantity which is used for modifying a predetermined base threshold quantity.

Still referring to FIG. 4, the measured wheel speed and the estimated vehicle speed are fed into block 100, which determines a slip depth feedback. The slip depth feedback is also a threshold modification quantity used for modifying the predetermined base threshold quantity. A summing circuit 80 is used to add the threshold modification quantities from multiplier 76 and block 100 to the base slip threshold to produce the slip threshold parameter for use by controller 36.

Slip threshold generator 40 of FIG. 2 increases the slip threshold parameter if the requested slip is greater than the current amount of slip being held. Otherwise, the slip threshold parameter is kept at the base slip threshold value. When the slip threshold is increased, the amount of increase is dependent upon the gain quantity computed by function generation circuit 62, as well as the slip depth feedback computed in block 100.

Figure 5:
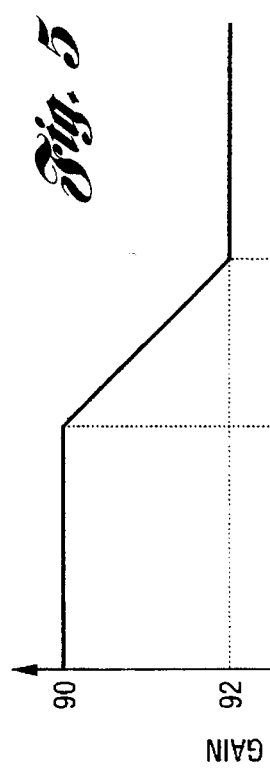
FIG. 5 is a gain versus average dump time plot according to the present invention.

FIG. 5 shows a gain versus average dump time curve in accordance with function generation circuit 62. Here, the gain is selected to be a piecewise linear function of average dump time, and is furthermore a non-increasing function of average dump time. Since the function is non-increasing, a greater amount of slip is added to the base slip threshold for smaller average dump times, as would occur when braking on a deformable surface. To the contrary, a smaller amount of slip is added to the base slip threshold for larger average dump times, as would occur when braking on a non-deformable surface or if significant levels of slip are achieved. Applying the slip threshold to controller 36 results in a slip feedback mechanism which automatically adjusts to the level of slip requested.

The specific gain versus average dump time curve is determined from the dump time of a vehicle when braking on different surfaces. Dump time may be characterized by recording the average dump time and the average slip depth during braking on a variety of surfaces at different speeds with the slip feedback disabled. For example, average dump time and slip depth can be recorded during braking on two deformable surfaces, such as a gravel and packed snow, and two non-deformable surfaces, such as jennite and polished concrete. Generally, the low μ deformable surfaces produce smaller average dump times and smaller average slip depths than low μ non-deformable surfaces.

The maximum value of the gain 90 is selected based upon the difference between the base slip threshold and the average slip measured during braking on the deformable surfaces. Similarly, the minimum value of the gain 92 is determined based upon the difference between the base slip threshold and the average slip measured during braking on the non-deformable surfaces. The value of a first break point 94 is determined based upon the average dump times recorded for the deformable surfaces. The value of a second break point 96 is determined based upon the recorded average dump times for the non-deformable surfaces.

Figure 7:
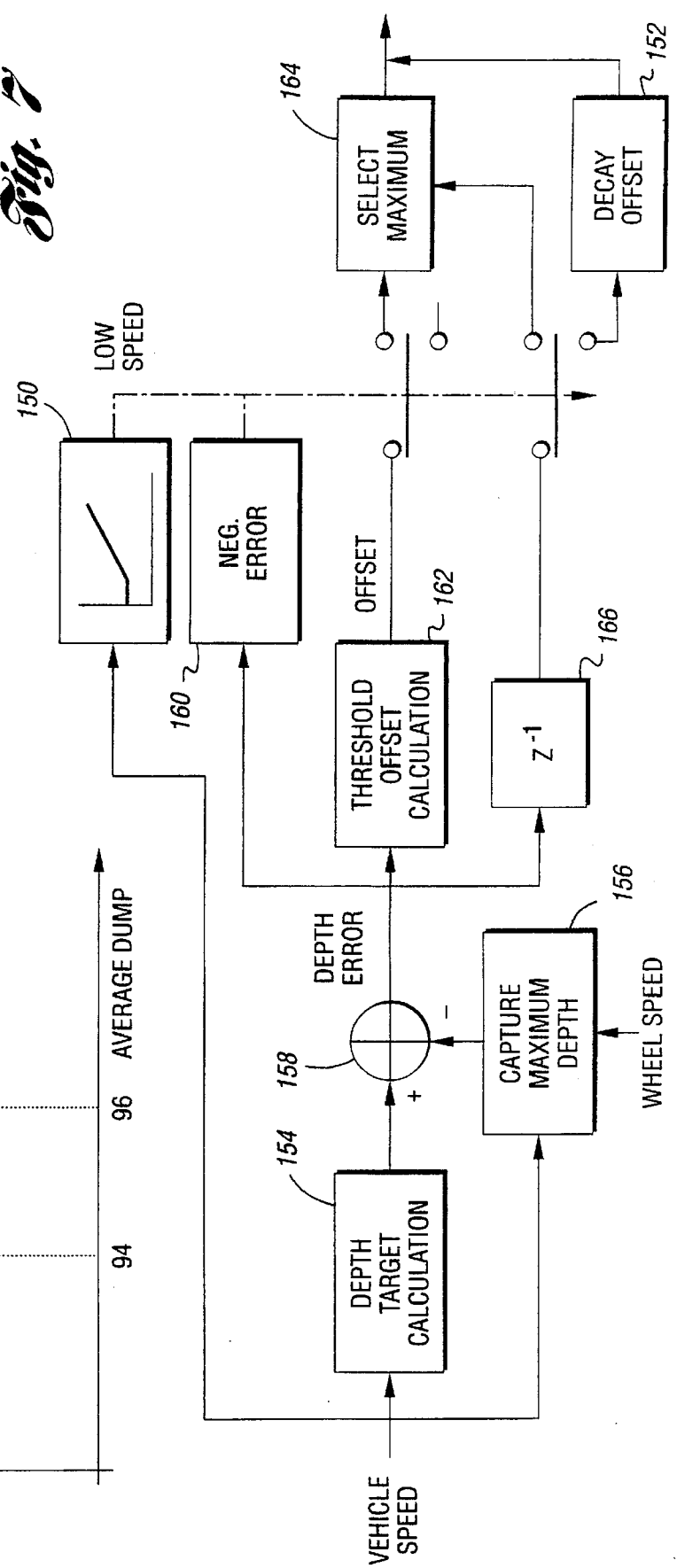
FIG. 7 is a block diagram of a slip depth feedback portion of the present invention.
Figure 6:
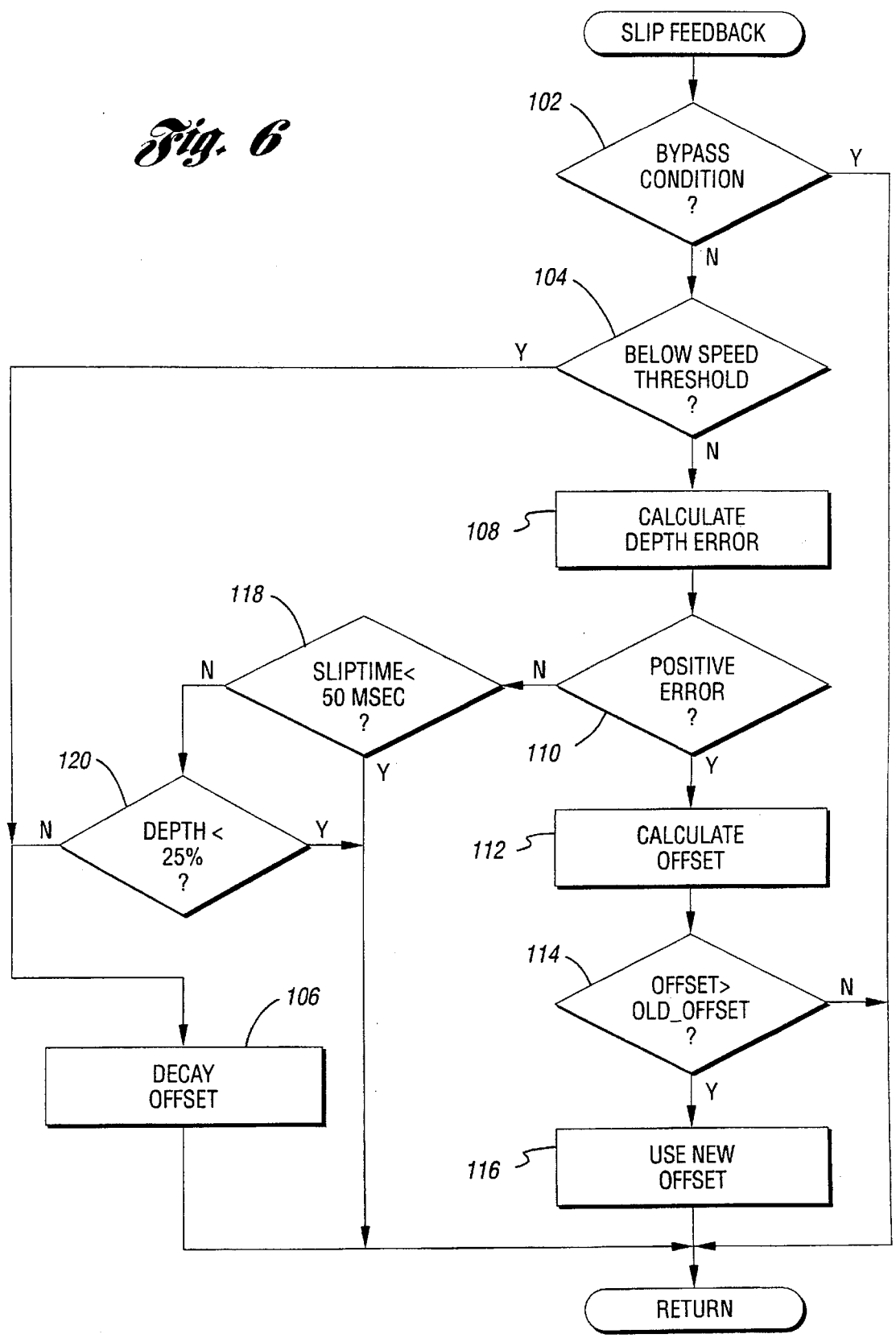
FIG. 6 is a flowchart of a slip depth feedback portion of the present invention.

Referring next to FIGS. 6 and 7, a flowchart and a block diagram of a slip depth feedback portion of the present invention are shown, respectively. As seen therein, departure depth is used to establish an offset to the slip threshold used for ABS control. More specifically, small departures, which are indicative of a deformable surface, are used to add an offset to (increase) the slip threshold, thereby increasing wheel slip and improving stopping performance.

As seen in FIG. 6, various bypass conditions are tested for at decision block 102. If any one of these conditions exist, the slip feedback mechanism is temporarily bypassed. More specifically, the mechanism is always bypassed for the first departure since there will be no slip depth information as yet. To ensure smooth control of vehicle yaw, the mechanism is also bypassed if the vehicle is on a split μ surface. Finally, the mechanism is also bypassed when a surface transition occurs, such as high to low μ, or low to high μ. In such an event, bypass continues until after the first departure on the new surface.

Thereafter, a selected vehicle speed threshold is tested for at decision block 104. If vehicle speed is below the threshold, any existing offset to the slip threshold is decayed at selected rate, preferably with a 1/64th filter, via block 106. In so doing, the offset added to the base slip threshold is continuously reduced by the decay function so that the offset generally has decayed to zero just before vehicle speed reaches zero, thereby preventing premature wheel lock or excessive wheel slip an low speeds.

If vehicle speed is above the threshold, a slip depth error is then calculated at block 108. In that regard, a slip depth target is first calculated which is 12.5% of the estimated vehicle speed. Slip depth is then measured and compared to the target at block 110. If it is less than the target, the difference (i.e., positive error) is used to calculate an offset to the slip threshold at block 112.

Such an offset is calculated by applying a speed dependent gain to the depth error. More specifically, the offset may be calculated according to the following formula:

Offset=(Est. Vehicle Speed/128)*Depth Error

As an example, at an estimated vehicle speed of 50 mph, the target slip depth is 6.25 mph. For an actual slip depth of 4.25 mph, the slip depth error is then 2 mph. According to the above formula, slip depth offset would then be:

Offset=(50/128)*2=0.78 mph

A deadband is introduced by comparing the newly calculated offset to the current value at decision block 114. If the new offset value is less than the current offset, then no change to the offset is made. However, if the new offset value is greater than the current offset, the offset is set equal to new offset value at block 116.

Where the slip depth is greater than the calculated slip depth target, slip depth error is negative. In that event, the slip duration is measured and compared to a selected slip duration threshold, preferably 50 msec, at block 118. If slip duration is less than the threshold, no change is made to the slip threshold offset.

However, if slip duration is greater than the threshold, then the slip depth is compared to a slip depth threshold, preferably 25% of the estimated vehicle speed, at block 120. If slip depth is less than the threshold, no change is made to the slip threshold offset. If, however, slip depth exceeds the threshold, the existing slip threshold offset is decayed at a selected rate, preferably with a 1/8th filter, at block 106.

As previously stated, the slip depth feedback mechanism of the present invention is shown in FIG. 7 in block diagram form. The slip feedback mechanism shown therein also represents an expanded view of the slip depth feedback block 100 from FIG. 4.

As seen in FIG. 7, in the event vehicle speed is less than a selected speed threshold, low speed block 150 and decay offset block 152 provide for decay of the existing slip threshold offset as described above with reference to FIG. 6. If not, slip depth target block 154 calculates a target slip depth, also as described above with reference to FIG. 6. Thereafter, the maximum measured slip depth captured at block 156 is subtracted from the target slip depth via differencing circuit 158 to determine a slip depth error.

If the slip depth error is negative, negative error block 160 combines with decay offset block 152 to provide for decay of the existing slip threshold offset as described above with reference to FIG. 6. Otherwise, threshold offset block 162 calculates a slip threshold offset, also as described above with reference to FIG. 6. Thereafter, again as described above with reference to FIG. 6, select maximum block 164 selects the greater of the newly calculated slip threshold offset value and the previous slip threshold offset value stored at block 166.

As previously stated, modification of the slip threshold offset in dependence upon slip depth feedback may be undertaken in addition to or instead of modification of the slip threshold offset in dependence upon average duration of the pressure dump stage of ABS brake cycles. It should be noted that where the slip threshold offset is modified in dependence upon average duration of the pressure dump stage, the offset to the slip threshold is re-calculated each departure cycle for application during the next cycle. Where the slip threshold offset is modified in dependence upon slip depth feedback, however, the offset can be maintained for the entire ABS stop if consistent departure depth is maintained.

The previously described versions of the present invention have many advantages, including the ability to reduce stopping distance when braking on a deformable surface by increasing the slip threshold parameter therefor. Moreover, by cyclically modulating the brake pressure to avoid wheel lock-up, directional control of the vehicle is maintained.

While the best modes for carrying out the invention have been described in detail, those familiar with the art will recognize various alternative designs and embodiments for practicing the invention as defined by the following claims.

What is claimed is:

1. For use with a vehicle having an antilock brake system (ABS) including a pressure-responsive brake, a method for controlling the brake during an ABS event, the method comprising:

performing an ABS brake pressure cycle including a pressure apply stage and a pressure dump stage, the ABS brake pressure cycle having an activation condition based upon a slip threshold parameter;

measuring a time duration of the pressure dump stage of the ABS cycle; and varying the slip threshold parameter in dependence upon the measured time duration of the pressure dump stage wherein varying the slip threshold parameter includes computing a threshold modification quantity in dependence upon the measured time duration of the pressure dump stage, including calculating an average dump time quantity based upon the measured dump time of a plurality of ABS cycles, and computing a gain quantity as a function of the average dump time quantity, and modifying a predetermined base threshold quantity by the threshold modification quantity to form the slip threshold parameter.

2. The method of claim 1 wherein the threshold modification quantity is a substantially nonincreasing function of the measured time duration of the pressure dump stage.

3. The method of claim 1 wherein the gain quantity is a substantially nonincreasing function of the average dump time quantity.

4. The method of claim 1 further comprising:

measuring a slip depth quantity during the ABS cycle; and varying the slip threshold parameter in further dependence upon the slip depth quantity.

5. The method of claim 4 wherein varying the slip threshold parameter in further dependence upon the slip depth quantity comprises:

computing a further threshold modification quantity in dependence upon the measured slip depth quantity; and modifying the predetermined base slip threshold by the further threshold modification quantity to form the slip threshold parameter.

6. The method of claim 5 wherein computing the further threshold modification quantity comprises calculating an average slip depth based upon a plurality of ABS cycles.

7. A system for controlling a pressure applied to a pressure-responsive brake of a wheel of a vehicle, the system comprising:

a wheel sensor for sensing a rotational behavior of the wheel;

a brake pressure controller, responsive to the wheel sensor and coupled to the brake, which performs a cyclic control of pressure applied to the brake, wherein a brake pressure cycle includes a pressure apply stage and a pressure dump stage having an activation condition based upon a slip threshold parameter;

duration measuring means for measuring a time duration of the pressure dump stage of the brake pressure cycle; and threshold varying means for varying the slip threshold parameter employed by the brake pressure controller in dependence upon the measure time duration of the pressure dump stage wherein the threshold varying means includes computing means for computing a threshold modification quantity independence upon the measured time duration of the pressure dump stage, the computing means including means for calculating an average dump time quantity based upon the measured dump time of a plurality of ABS cycles, and gain computation means for computing a gain quantity as a function of the average dump time quantity, and modifying means from modifying a predetermined base threshold quantity by the threshold modification quantity to form the slip threshold parameter.

8. The system of claim 7 wherein the threshold modification quantity is a substantially nonincreasing function of the measured time duration of the pressure dump stage.

9. The system of claim 7 wherein the gain quantity is a substantially nonincreasing function of the average dump time quantity.

10. The system of claim 7 further comprising:

measuring means for measuring a slip depth quantity during the ABS cycle; and threshold varying means for varying the slip threshold parameter in further dependence upon the slip depth quantity.

11. The system of claim 10 wherein the threshold varying means for varying the slip threshold parameter in further dependence upon the slip depth quantity comprises:

computing means for computing a further threshold modification quantity in dependence upon the measured slip depth quantity; and modifying means for modifying the predetermined base slip threshold by the further threshold modification quantity to form the slip threshold parameter.

12. The system of claim 11 wherein the computing means for computing the further threshold modification quantity comprises calculating means for calculating an average slip depth based upon a plurality of ABS cycles.

* * * * *